(12) United States Patent
Meier et al.

(10) Patent No.: US 7,373,508 B1
(45) Date of Patent: May 13, 2008

(54) WIRELESS SECURITY SYSTEM AND METHOD

(75) Inventors: Robert Meier, Cayahoga Falls, OH (US); Victor Griswold, North Canton, OH (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

(21) Appl. No.: 10/161,869

(22) Filed: Jun. 4, 2002

(51) Int. Cl.
*H04L 9/00* (2006.01)

(52) U.S. Cl. ............... 713/168; 713/155; 713/169; 713/170; 726/2; 726/4; 380/270

(58) Field of Classification Search ............ 713/169, 713/155, 168, 170; 380/270; 455/411; 726/2, 726/4
See application file for complete search history.

(56) References Cited

U.S. PATENT DOCUMENTS

| 5,889,958 | A | * | 3/1999 | Willens ............... 709/229 |
| 6,088,451 | A | * | 7/2000 | He et al. ............ 726/8 |
| 6,345,043 | B1 | | 2/2002 | Hsu ............... 370/324 |
| 6,377,691 | B1 | * | 4/2002 | Swift et al. ........ 380/277 |
| 6,856,800 | B1 | * | 2/2005 | Henry et al. ........ 455/411 |
| 7,024,556 | B1 | * | 4/2006 | Hadjinikitas et al. ... 713/168 |
| 7,174,456 | B1 | * | 2/2007 | Henry et al. ........ 713/158 |
| 2002/0078243 | A1 | * | 6/2002 | Rich et al. ......... 709/248 |
| 2002/0138551 | A1 | * | 9/2002 | Erickson ........... 709/203 |
| 2003/0084287 | A1 | * | 5/2003 | Wang et al. ........ 713/168 |
| 2003/0166397 | A1 | * | 9/2003 | Aura ................ 455/410 |
| 2003/0208677 | A1 | * | 11/2003 | Ayyagari et al. .... 713/168 |
| 2004/0078571 | A1 | * | 4/2004 | Haverinen ......... 713/168 |

OTHER PUBLICATIONS

Trostle, Jonathan, "The Secure Lightweight Authentication Mechanism", Network Working Group, University of WA, Oct. 2001.
Barkley, Warren et al., "802.11 Roaming and Shared Use Access Points", IEEE802.11-01/TBD, Nov. 2001.

* cited by examiner

*Primary Examiner*—Nasser Moazzami
*Assistant Examiner*—Shanto M. Z. Abedin
(74) *Attorney, Agent, or Firm*—Cindy Kaplan

(57) ABSTRACT

A method for reauthentication during client roaming in a wireless network system. The network has at least one access server and a plurality of access points registered with the access server. The method includes receiving a registration request at the access server from a new access point for a roaming client registered with the access server and sending a client's session key to the new access point in a registration reply upon authentication of the registration request. The client's session key is configured for use by the new access point to authenticate the client and establish keys for the client. A method for secure context transfer during client roaming is also disclosed.

27 Claims, 13 Drawing Sheets

WIRELESS SECURITY SYSTEM AND METHOD

BACKGROUND OF THE INVENTION

The present invention relates generally to communication networks, and more specifically, to a security protocol for use in a wireless network system.

Wireless communications has experienced tremendous growth over recent years. Wireless technology allows people to exchange information at virtual any location using pagers, cellular telephones, and other wireless communication products. Network users can move about almost without restriction and access LANs (Local Area Networks) from nearly anywhere. IEEE 802.11 is a wireless LAN standard that enables mobile stations to roam between Access Points (APs) attached to an Ethernet LAN. The IEEE 802.11 architecture consists of several components that interact to provide a wireless LAN that supports station mobility transparently to upper layers. This architecture uses fixed network APs with which mobile nodes can communicate. An AP is a station that provides access to a distribution system by providing distribution services in addition to acting as a station. As shown in FIG. 1 the network may include, for example, a plurality of remote users 20 connected to a wireless network, a plurality of wireless access points (AP1, AP2) connected to the wireless network and the Internet, and a server 22 (e.g., proxy or server of an Internet Service Provider (ISP)). The APs are used to access server 22 and provide communication between a local station in a wireless LAN and a remote station in another LAN.

With the added convenience of wireless access comes heightened security concerns. When transmissions are broadcast over radio waves there is a need to employ additional mechanisms to protect the communications. The IEEE 802.11 standard for wireless LAN communications introduced the Wired Equivalent Privacy (WEP) protocol in an attempt to address these new problems and bring the security level of wireless systems similar to that of wired systems. The 802.11i draft standard specifies protocols for mutual authentication and privacy between a client and its parent AP. A parent AP must authenticate with a client to prevent a "man-in-the-middle" security attack. The client and AP share a session key which is used to establish WEP keys for the client. Privacy is accomplished by encrypting packets with a WEP key that is unique for each client-AP pair.

The current 802.11i standard does not define a fast re-authentication method. In addition, management frames are not authenticated and there are no cryptographic operations in critical paths. Full authentication occurs after each reassociation. Thus, stations need to complete a full authentication conversation before recovering connectivity. Furthermore, authentication and key management methods requiring public key operations can take several seconds to complete.

The current IEEE 802.11i draft standard is based on the IEEE 802.1X port-level authentication protocol. IEEE 802.1X is a standard (approved in June 2001) that enables authentication and key management for 802 LANs, including Ethernet, Token Ring, and FDDI. IEEE 802.1X utilizes Extensible Authentication Protocol (EAP) as its authentication framework. IEEE 802.11i has four primary components: a) supplicant; b) 802.1X authenticator; c) authentication server (e.g., RADIUS server); and d) higher-layer authentication protocol. A supplicant is a security entity located at a client and an authenticator is a security entity located at an AP. Whenever a client associates with a parent AP, the client and AP must mutually authenticate and establish a session key, via the authentication server. The AP uses the session key for a client to securely establish encryption keys (i.e., WEP, AES) for the client. The current 802.11i draft standard requires a client to authenticate with its new parent AP via the authentication server and the higher-layer authentication protocol each time that it roams. The AP typically forwards client authentication requests to a central AAA server such as a RADIUS (Remote Access Dial-in User Service) server. IEEE 802.11i also provides a mechanism where an AAA server can establish a secret session key (or keys) for each AP/client pair.

Since the client must reauthenticate with its new parent AP each time that it roams, normal data communications cannot proceed until the authentication process has been completed. Full authentication typically takes a relatively long time because it requires the services of an AAA server, which may be centrally located on a remote subnet. Slow roaming prohibits some QoS applications in clients. For example, a lengthy authentication process disrupts time-sensitive applications, such as Voice-over IP (VoIP)).

The original IEEE 802.11i draft proposed a fast roaming Kerberos-based security mechanism to avoid slow roaming problems. Kerberos is a network authentication protocol. It is designed to provide authentication for client/server applications by using secret-key encryption. The Kerberos authentication system uses a series of encrypted messages to prove to a verifier that a client is running on behalf of a particular user. In Kerberos, the user's session key is derived from a password. Each client and application server shares a session key with the authentication server. Whenever a client authenticates itself to a new verifier, it relies on the authentication server to generate a new encryption key and distribute it securely to both parties using the session keys. A Kerberos ticket is used to distribute the key to the verifier. The Kerberos ticket is a certificate issued by an authentication server and encrypted using the application server key. The ticket is sent to the client who forwards it to the verifier in the application server as part of the application request. Because the ticket is encrypted in the application server key, known only by the authentication server and intended verifier, it is not possible for the client to modify the ticket without detection.

The proposed solution required a client to initially obtain a Kerberos ticket for a network access service provided by the AP. The Kerberos ticket was used for fast, mutual reauthentication each time the client roamed to a new parent AP. The proposal was eventually dropped from the IEEE 802.11 draft because it had a number of significant drawbacks. One drawback was that it required an 802.11 customer to install a Kerberos security infrastructure. Furthermore, security was weakened because all APs had to share a secret key to avoid accessing a Kerberos security server each time that a client roamed.

Roaming also requires operational context information to be securely transferred from an old parent AP to a new parent AP. Context information includes, for example, QoS state, authentication state, group membership, and IP/MAC address bindings. A draft standard Inter-Access Point Protocol (IAPP) has been developed by the IEEE 802.11f working group for transferring context information. When a client roams, the new parent AP sends a Move-Notify message to the old AP and the old AP returns context information in a corresponding Move-Response message. This draft standard, however, does not address the issue of how to transfer context securely.

Another issue with 802.11 networks is sidestream transmissions. In an infrastructure network, a client cannot send a frame directly to another client. Instead, all client traffic is routed through a parent AP. The current IEEE 802.11e draft standard permits sidestream transmissions where a client associated with an AP can send frames directly to another client associated with the same AP, without routing the frames through the AP. The IEEE 802.11 draft version (e) specifies a sidestream setup protocol. This requires the first client to send a Location Discover request to its parent AP to inquire if a second client can participate in a sidestream session. The AP then returns a Location Discover response to the first client. If a sidestream session is possible, the first client sends a Direct Communication request to the second client. The second client then returns a Direct Communication response to the first client. A method does not currently exist, however, for mutual authentication and privacy for sidestream transmissions. The use of sidestream transmissions is therefore severely restricted.

SUMMARY OF THE INVENTION

A method for reauthentication during client roaming in a wireless network system is disclosed. The network has at least one access server and a plurality of access points registered with the access server. The method includes receiving a registration request at the access server from a new access point for a roaming client registered with the access server and sending a client's session key to the new access point in a registration reply upon authentication of the registration request. The client's session key is configured for use by the new access point to authenticate the client and establish keys for the client.

In another aspect of the invention, a method for providing private sidestream transmissions between a first and second client in a wireless network generally comprises sending a location discovery request from a first client to an access point and receiving a location discovery response from the access point. The response includes a ticket encrypted with a session key of the second client and containing a sidestream key. The method further includes sending a direct communication request from the first client to the second client. The request includes the ticket and an authenticator encrypted with the sidestream key. A direct communication response including an updated authenticator is received from the second client. The method further includes decrypting the updated authenticator with the sidestream key.

A wireless security protocol system generally comprises a central access server and a plurality of local access servers associated with the central access server. Each local access server has at least one access point associated therewith. The access points are each registered with the associated local access servers and central access server. The local access server comprises a processor configured to mutually authenticate and establish a secret session key with the central access server and the access points through an authentication server, and operate as a key distribution center for clients roaming between different access points so that no authentication is required between the client and the authentication server during roaming.

In yet another aspect of the invention, a computer program product for reauthentication during client roaming in a wireless network system generally comprises code that receives a registration request at the access server from a new access point for a roaming client registered with the access server and code that sends a client's session key to the new access point in a registration reply upon authentication of the registration request. The client's session key is configured for use by the new access point to authenticate the client and establish keys for the client. The product further includes a computer-readable storage medium for storing the codes.

In another aspect of the invention, a method for secure context transfer during client roaming from an old access point to a new access point generally comprises receiving a registration request at the access server from the new access point for a roaming client registered with the access server and sending a message to one of the new and old access points. The message contains a ticket encrypted with a session key of at least one of the new and old access points and a context transfer key. The ticket and context transfer key are configured to securely transfer context information from the old access point to the new access point.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
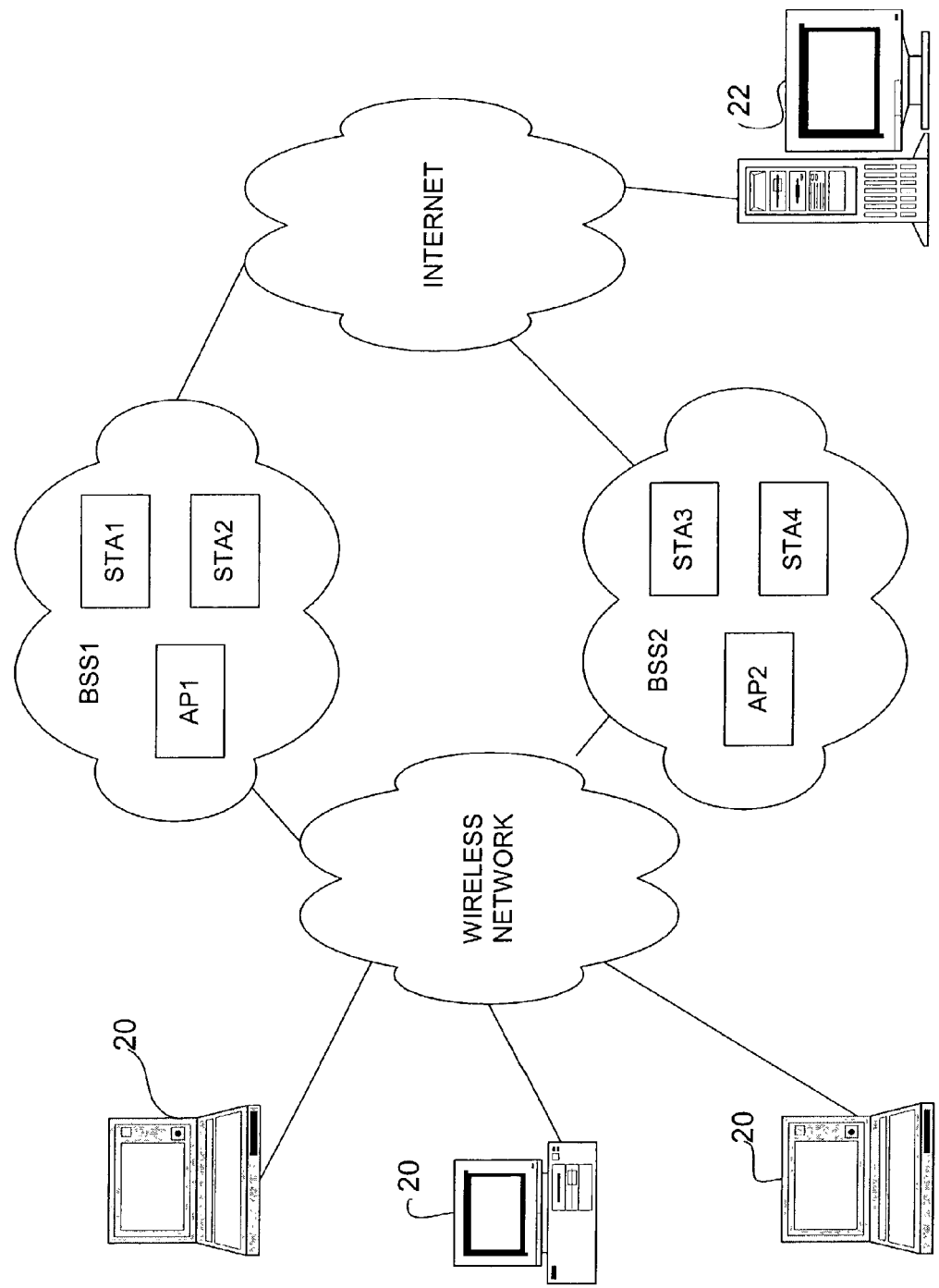
FIG. 1 is a diagram illustrating architecture for a wireless LAN system.

The present invention operates in the context of a data communication network including a wireless network system. FIG. 1 illustrates a typical architecture of a wireless LAN system. The network includes two basic service sets (BSS1, BSS2), each comprising one access point (AP) and two wireless stations. BSS1 includes AP1, STA1, and STA2 and BSS2 includes AP2, STA3, and STA4. Each wireless station associates itself with one of the APs before communicating with a server 22 coupled to the Internet. When the wireless LAN station is first turned on, it looks for an AP and registers itself with the AP. The station can then synchronize with the AP and transmit and receive information to and from the AP. The registration includes an authentication process which is used to identify whether the station has the right to access the wireless network via a medium access control (MAC) Layer. Before the authentication is passed, the station establishes a connection with the AP by sending an association request packet to the AP and waiting to receive a response frame from the AP which acknowledges the association. It is to be understood that the network shown in FIG. 1 is only one example and many different configuration networks having different types and numbers of network elements may be used.

Roaming requires shared use APs. The system described herein is a wireless security protocol used to manage the mobility context for roaming stations (as defined, for example, in IEEE 802.11). The protocol is a hierarchical fast reauthentication protocol that supports fast roaming for IEEE 802.11 clients. As described below, the system provides fast authentication and secure context transfer when a client roams and a security mechanism for sidestream transmissions.

Figure 2:
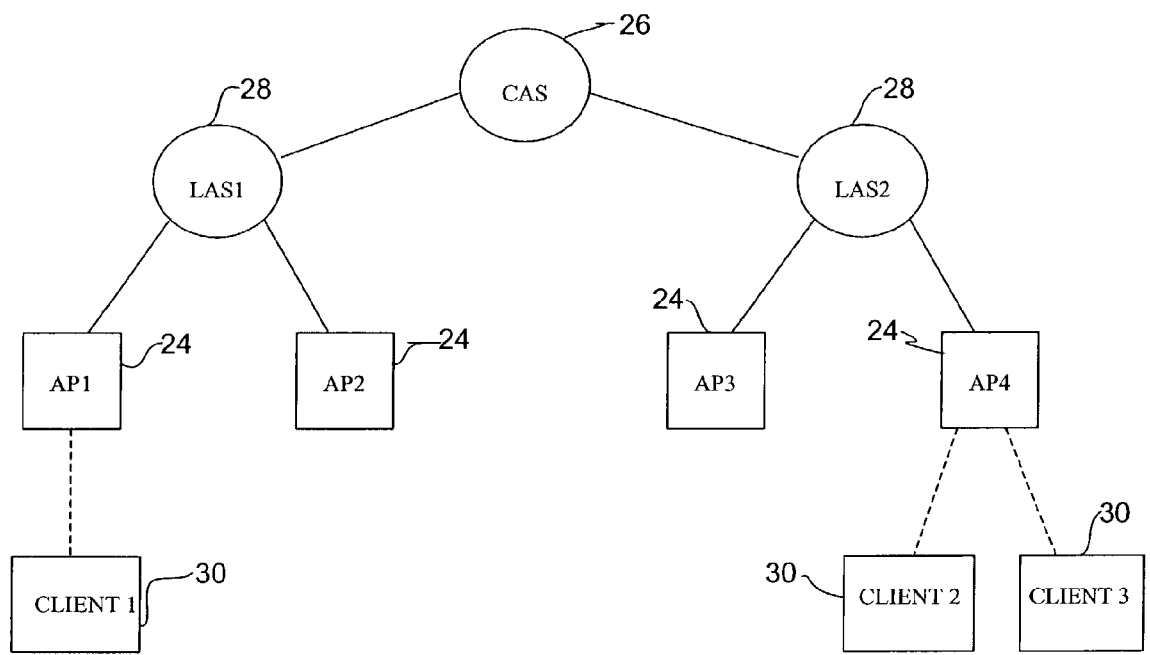
FIG. 2 is a diagram illustrating an example of a wireless security protocol network of the present invention.

FIG. 2 illustrates details of a wireless security protocol network. As shown in FIG. 2, a Central Access Server (CAS) 26 is provided at the top level of the hierarchy, followed by optional Local Access Servers (LAS) 28, Access Points (AP) 24, and clients 30 at the lowest level in the hierarchy. The network shown in FIG. 2 includes a Central Access Server (CAS), two Local Access Servers (LAS1, LAS2), four Access Points (AP1, AP2, AP3, AP4), and three clients (client 1, client 2, client 3). The CAS 26 provides a central control point and context repository for each subnet. Each AP 24 registers and authenticates as previously described with its corresponding LAS 28 and CAS 26. The LAS 28 is located to facilitate fast context transfer and fast reauthentication. The CAS 26 and LAS 28 may be dynamically installed anywhere in the network to minimize roaming delays (since they do not need a physically secure key database). A LAS may be located, for example, on each IP subnet. It is not necessary to access the CAS each time that a client roams between APs within the domain of a single LAS.

The wireless security protocol can be extended to facilitate secure context transfer between any two wireless security protocol nodes. For example, the wireless security protocol context transfer mechanism (described below) may be used to securely transfer context from LAS1 to LAS2. It is to be understood that the network shown in FIG. 2 is only one example and the wireless security protocol described herein may be used on many different configuration networks. For example, the number of hierarchy levels shown in FIG. 2 can be easily increased. The wireless security protocol can also be easily extended to support caching and secure transfer of client configuration information so that it is not necessary to access a remote configuration database each time a client roams.

The clients 30, APs 24, LASs 28, and CAS 26 have a static, pre-existing security relationship with an authentication server (not shown). Each AP 24 and LAS 28 are configured to mutually authenticate and establish a secret session key with the CAS 26 via the authentication server. The client 30 mutually authenticates and establishes a secret session key with the CAS 26 or LAS 28. The secret session key for a client 30 is securely forwarded to the client's parent AP 24. The wireless security protocol may use any authentication server (e.g., RADIUS server) and higher-level authentication protocol, which enable mutual client/server authentication and dynamic derivation of client/server session keys. Thus, the wireless security protocol does not require changes to existing clients, higher-layer authentication protocols, or authentication servers.

The wireless security protocol preferably uses Key Distribution Centers (KDCs), such as used in Kerberos network authentication protocol, for stations which have dynamically established a secret session key with the CAS 26, LAS 28, or AP 24. A Kerberos-like security protocol is used to mutually authenticate and establish a session key for any two stations in the domain of a KDC. The wireless security protocol differs from Kerberos in that it is not dependent on any single security infrastructure. Also, a pre-existing, static security relationship (i.e., password) is not required between a KDC and stations that use its services. Since each CAS 26, LAS 28, and AP 24 are configured to operate as a KDC, multiple KDCs may be located throughout the network, as required for optimal performance. The security database for the KDC does not need to be physically secure, as is required by Kerberos. As described below with respect to context transfer, the LAS 28 may act as a KDC with an old (original) AP 24 functioning as a Kerberos-like application server and a new AP functioning as a Kerberos-like client. In sidestream transmission operations, the AP 24 functions as a Kerberos-like KDC and clients 30 in communication with one another function as a Kerberos-like client and server. The CAS 26 and LAS 28 preferably include a logical entity such as an 802.1X authenticator. Each AP 24 and client 30 mutually authenticate, and establish a session key with the 802.1X authenticator in the CAS 26 or LAS 28, via any appropriate security server and authentication protocol. It is to be understood that a network authentication protocol other than Kerberos may be used without departing from the scope of the invention. The protocol can be used with any 802.11i security method that establishes a shared secret session key between an AP and client station (e.g., EAP-Kerberos or EAP-TLS).

As further described below, the wireless security system uses session keys, data encryption keys (DEKs) and context transfer keys (CTKs). As used herein, 'session key' refers to a secret key that is dynamically established between a LAS or CAS and a descendant node in the wireless security system hierarchy using a security server (e.g., RADIUS) and an authentication protocol such as TLS or Kerberos. DEKs are used on 802.11 links, by the 802.11 WEP or 802.11i AES encryption protocols to encrypt 802.11 data. The CTK is used in a secure context transfer process of the wireless security protocol.

The keys may be delivered using tickets. A KDC, for example, issues a ticket to help establish a key and a trusted relationship between two nodes. A ticket that is delivered to a first node is encrypted with the session key of the second node. For example, a KDC may deliver a ticket to a new AP that is encrypted with the session key shared between a LAS and an old AP, as further described below.

The shared secret key may be used to generate an authenticator. A first node sends an authenticator to a second node to prove that it has knowledge of a secret key shared by the nodes. The authenticator may be a MIC (Message Integrity Check) or encrypted value. For example, a new AP includes an authenticator in a registration request sent to the LAS 28. The authenticator is generated with the secret session key shared by the new AP and the LAS 28. It should be noted that this authenticator is different than the 802.1X authenticator described above.

The following describes the different operations of the client 30, AP 24, LAS 28, and CAS 26 during registration, client authentication, client reauthentication, context transfer, and sidestream transmissions using the wireless security protocol system.

A registration protocol is used to register each client 30 and AP 24 with the CAS 26. The registration protocol establishes mobility bindings for a client in each AP 24 and LAS 28 on the path to the CAS 26, including the CAS. The mobility bindings include the client identifier and the client's current parent AP 24. The registration protocol and the context transfer protocol described below are used to securely distribute session keys and other context information. The registration protocol removes the need for an AP discovery protocol, as defined in IEEE 802.11f. As discussed further below with respect to FIG. 7, when a client 30 roams, a LAS 28 automatically sends a context transfer ticket for the old AP to the new AP, since it maintains mobility bindings for each client in its domain.

Figure 3:
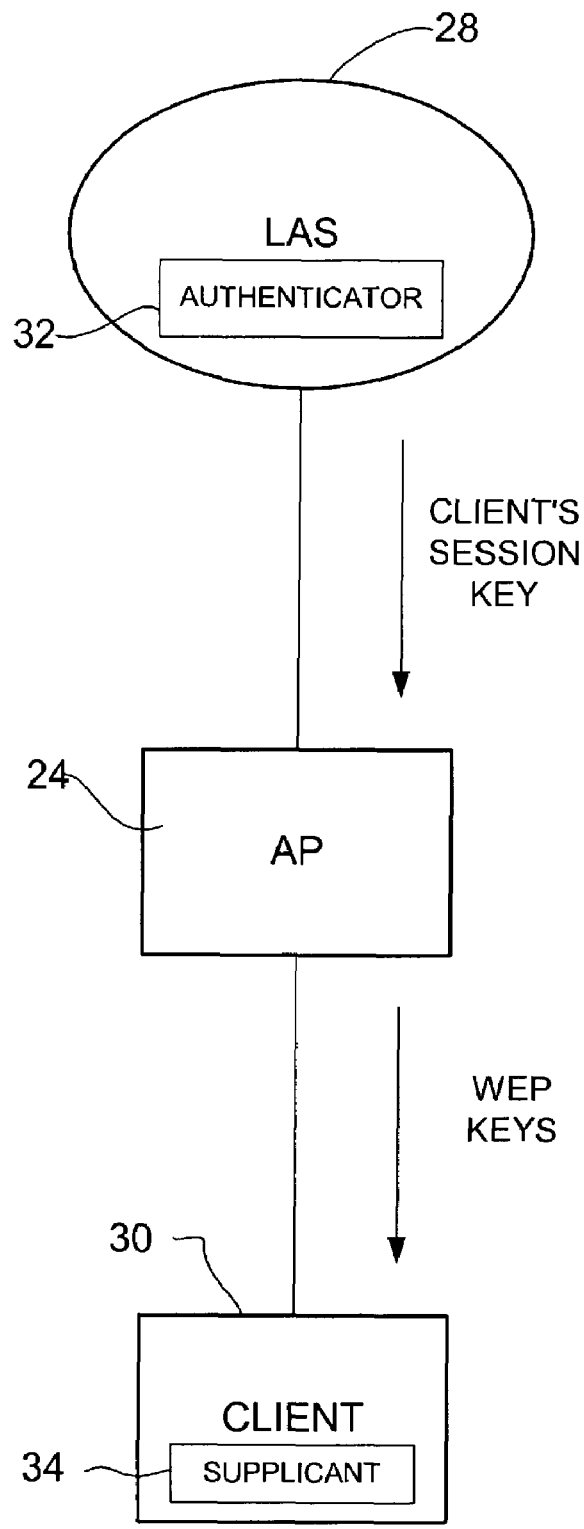
FIG. 3 is a diagram illustrating interaction between a client, AP, and LAS of the network during a client authentication process.
Figure 4:
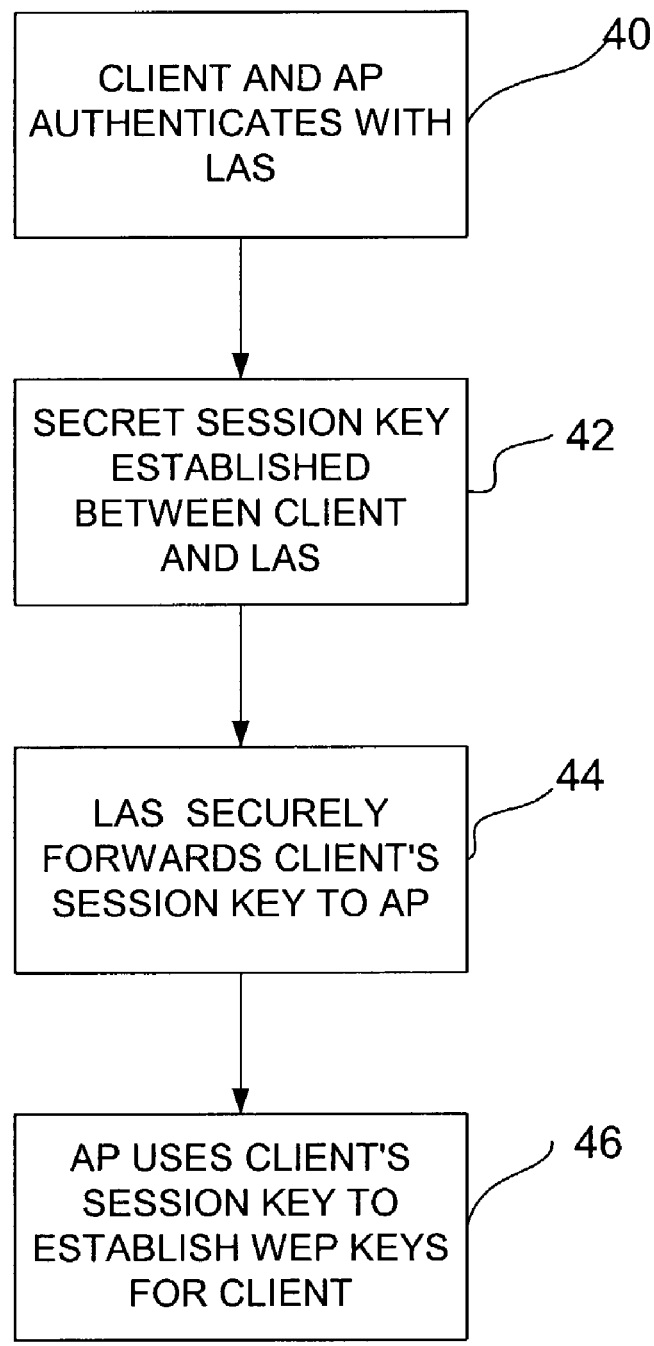
FIG. 4 is a flowchart illustrating a process for client authentication with the wireless security protocol.

An authentication process of the wireless security protocol is illustrated in the diagram of FIG. 3 and flowchart of FIG. 4. An authenticator 32 (as defined in IEEE 0802.1X, for example) is located in the LAS 28 (or CAS 26). The authenticator 32 contains the current value of the station's TSF timer, for example. The TSF timer is preferably a distributed timer as defined in IEEE 802.11. The TSF timer value is advertised by the AP 24 in periodic Beacon messages. Each client 30 and AP 24 authenticates with the LAS 28 (via, for example, an AAA server), when it initially accesses the network (step 40). A secret session key is established between each AP 24 or client 30 and the LAS 28 during initial authentication (step 42). When the client initially authenticates with a higher-layer authentication protocol, the parent AP 24 transparently and securely passes higher layer authentication messages between a client supplicant 34 and the authenticator 32. The LAS 28 securely forwards the client's session key to the parent AP 24, encrypted with the AP's session key (step 44). The AP 24 then uses the client's session key to establish WEP keys for the client (step 46). A client 30 may also be required to periodically authenticate via an AAA server (e.g., RADIUS) to establish new session keys. The client 30 uses its secret session key to create a ticket each time that the station roams to a new parent AP 24. As described below, the ticket contains a station identifier and an authenticator value, and may also include the station's secret session key. The ticket is encrypted with the client's secret session key or a key known only to the LAS (or CAS).

Figure 5:
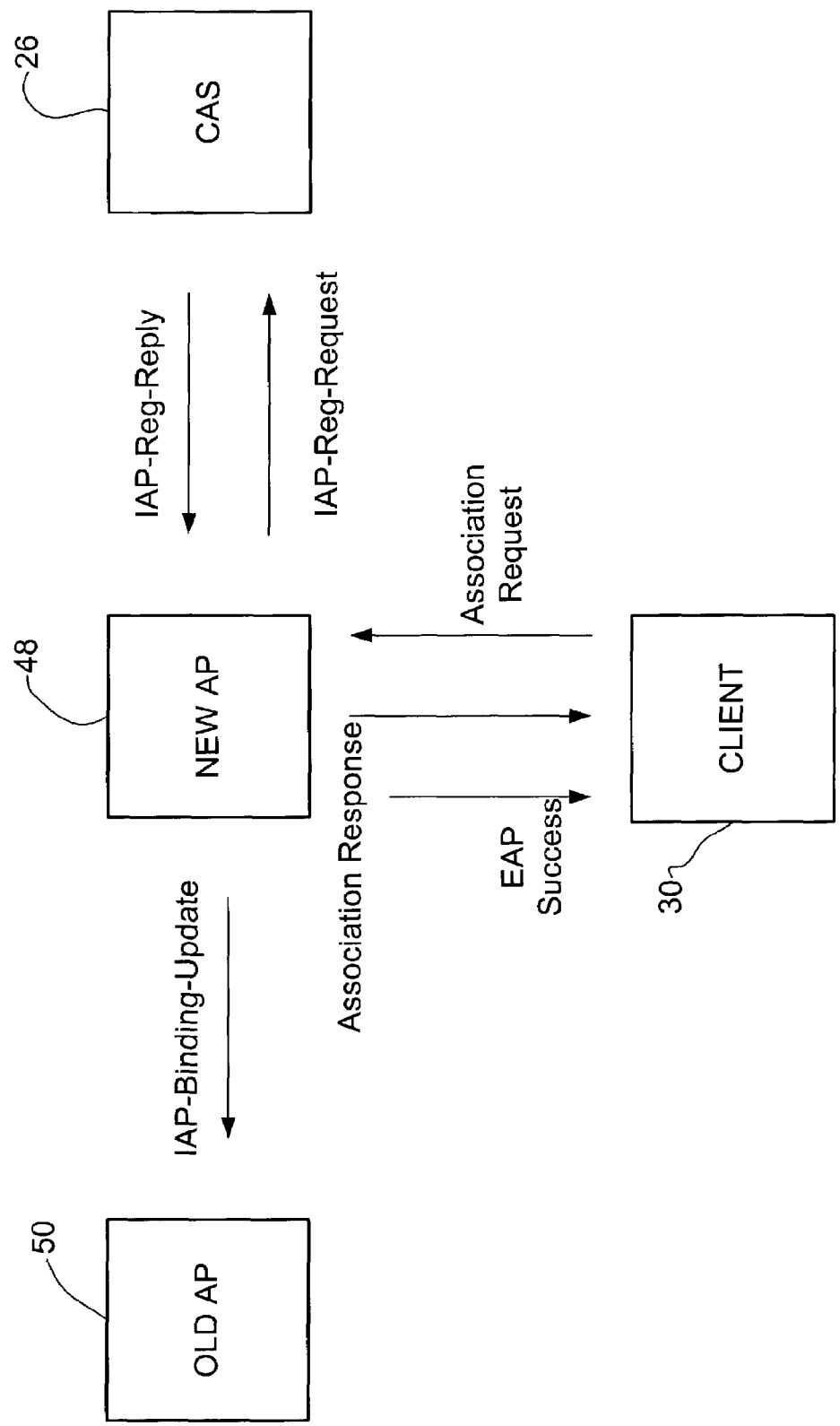
FIG. 5 is a diagram illustrating a registration process of the wireless security protocol.
Figure 6:
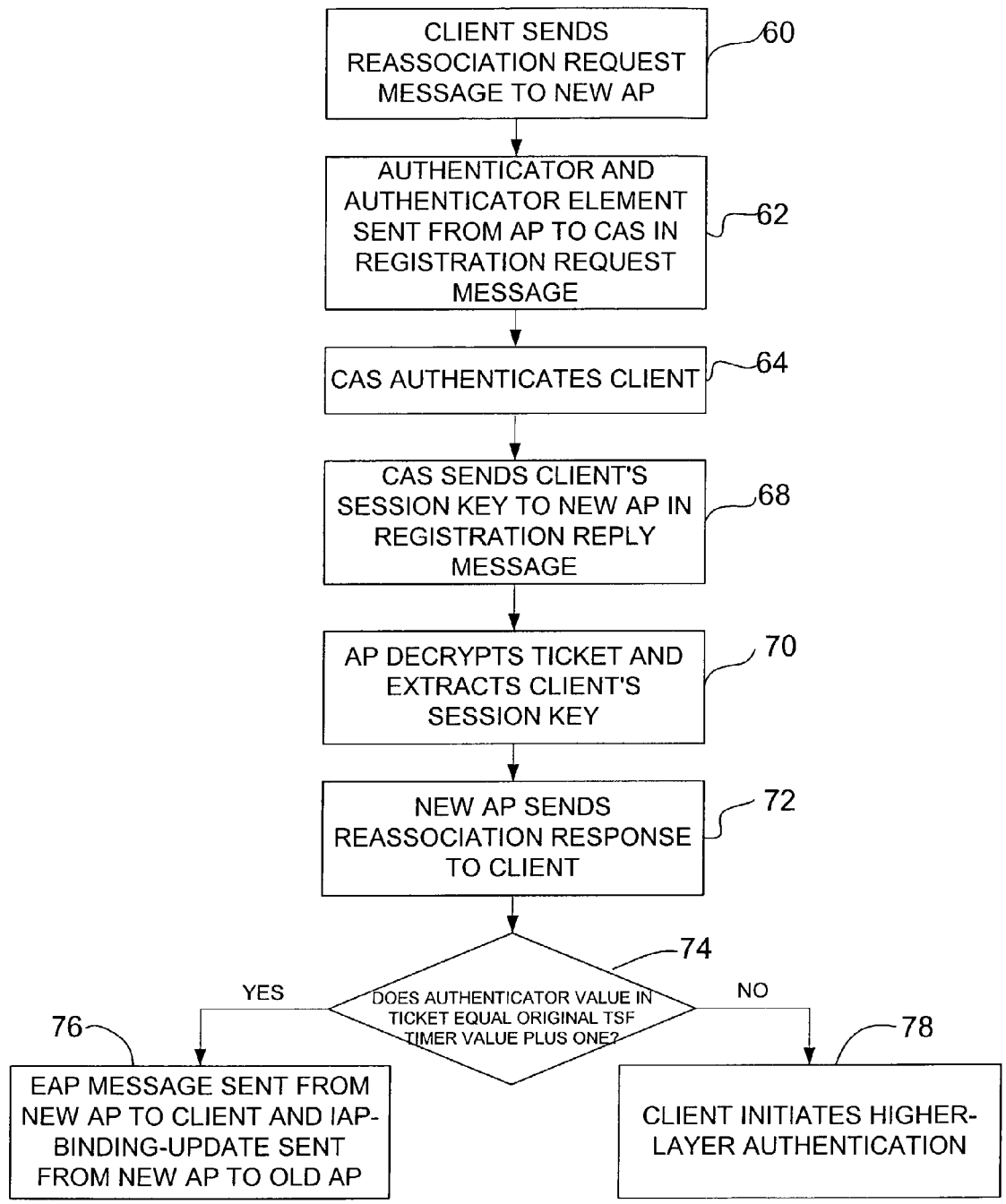
FIG. 6 is a flowchart illustrating a process for fast client reauthentication with the wireless security protocol.

A fast client reauthentication process is illustrated in FIGS. 5 and 6. When a client 30 roams, the client's previously established secret session key is used to quickly reauthenticate the client with a CAS 26 or LAS 28 and the client's new parent AP, without accessing a possibly remote security server (such as RADIUS). A security relationship between the old AP and the new AP is not required. When the client roams it sends a reassociation request message to its new parent AP 48 (step 60). The reassociation request message includes an authenticator element and a ticket. The client authenticator element and an authenticator for the new AP 48 are forwarded from the AP to the CAS 26 in a registration request message (LAP-Reg-Request) (step 62). The registration request message includes a client ID, the client's ticket, new AP bindings, and the TSF timer value of the parent AP 48. The registration request is authenticated with an AP_CAS authentication extension that is generated with the secret session key shared by the parent AP 48 and the CAS 26. The AP_CAS authentication extension is used to verify that the registration request is unmodified and that it is from an authorized AP. An NTP-time-based Registration Identifier (as defined in RFC 2002, "IP Mobility Support", C. Perkins, October 1996) is preferably used to prevent registration replays.

The CAS 26 attempts to authenticate the client 30 when it receives the registration request (step 64). The CAS 26 first decrypts the client's ticket with the secret session key shared by the client 30 and the CAS or known only to the CAS. The CAS 26 then compares the station ID in the ticket with the station ID in the registration request and compares the client's TSF timer with the AP's TSF timer. If the timestamp is within a specified window (e.g., five minutes) centered around the current time on the AP's timer, and the client IDs match, the CAS 26 accepts the request as authentic.

The CAS 26 securely returns the client's session key to the new parent AP 48 in a registration reply message (IAP-Reg-Reply) (step 68). A ticket, old AP bindings, and context are sent from the CAS 26 to the new AP 48. The unencrypted ticket is re-encrypted with the secret session key of the parent AP 48 and entered into the reply. The reply also contains an AP-CAS authentication extension and registration identifier to prevent modification and replay.

Upon receiving the registration reply, the parent AP 48 decrypts the ticket (step 70). The AP 48 extracts the client's session key and uses it to generate a WEP key for the client. The parent AP 48 then increments the authenticator in the ticket and re-encrypts the ticket with the client's session key.

The new AP 48 then sends a reassociation response to the client 30 with the encrypted ticket and an authentication status indicator (step 72). The parent AP 48 is authenticated by the client 30 if the authenticator value in the ticket equals the original TSF timer value plus one (step 74). It is to be understood that use of the TSF timer is provided only as an example and that other methods may be used without departing from the scope of the invention. The authentication status is used to indicate that the parent AP 48 has authenticated the client 30.

If the registration is successful, an EAP success message is sent from the new AP 48 to the client 30 and an IAP-Binding-Update is sent from the new AP 48 to the old AP 50 (step 76). The new AP 48 then uses the client's session key to mutually authenticate the client and to establish WEP keys for the client. Reauthentication does not require the client's session key to be securely transferred from the old AP 50 to the new AP 48. Therefore, the new AP 48 does not need to share a secret key with the old AP 50 for the purpose of reauthentication. Furthermore, it is not necessary for the new AP 48 to independently discover the address of the old AP 50, because it is automatically returned in the registration reply. The communication between the new AP 48 and the CAS 26 is completely transparent to the client.

If the client 30 cannot decrypt the ticket or if the authentication status indicates that the station is unauthenticated at the AP 48, the client station initiates full higher-layer authentication (e.g., 802.11i authentication) (step 78). A driver in the client 30 issues a "media sense connect" indication to invoke higher-layer authentication in a Microsoft Windows 2000 client, for example. The indication also causes a DHCP client to generate DHCP release and discover messages. The DHCP messages are used to free any old IP address and to obtain a topologically correct address, in case the client roamed to a new IP subnet. The driver can suppress the "media sense connect" indication if fast roaming authentication succeeds and the new parent AP 48 is on the same subnet as the old parent AP 50. An AP may advertise subnet information in Beacon and Probe Response messages (as defined in IEEE 802.11) so that clients 30 can easily determine if a new AP 48 is on the same subnet as the old AP 50. It is to be understood that the wireless security system of the present invention may be used to support reauthentication methods other than the fast reauthentication method described above.

Figure 7:
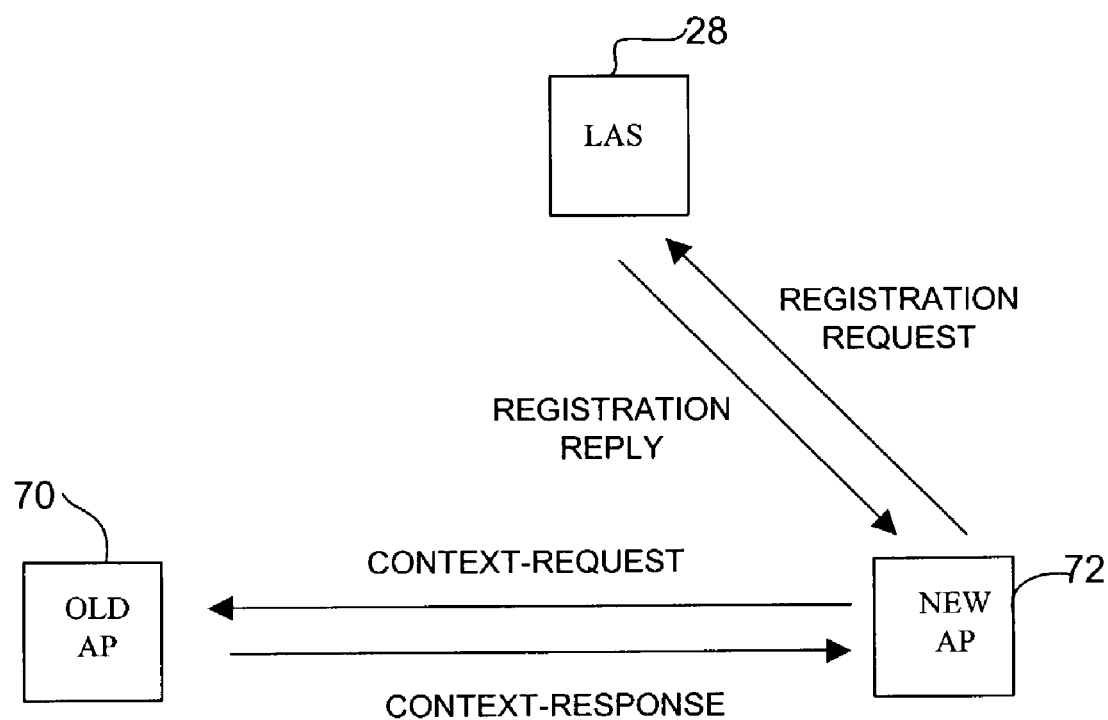
FIG. 7 is a diagram illustrating secure context transfer with the wireless security protocol.
Figure 8:
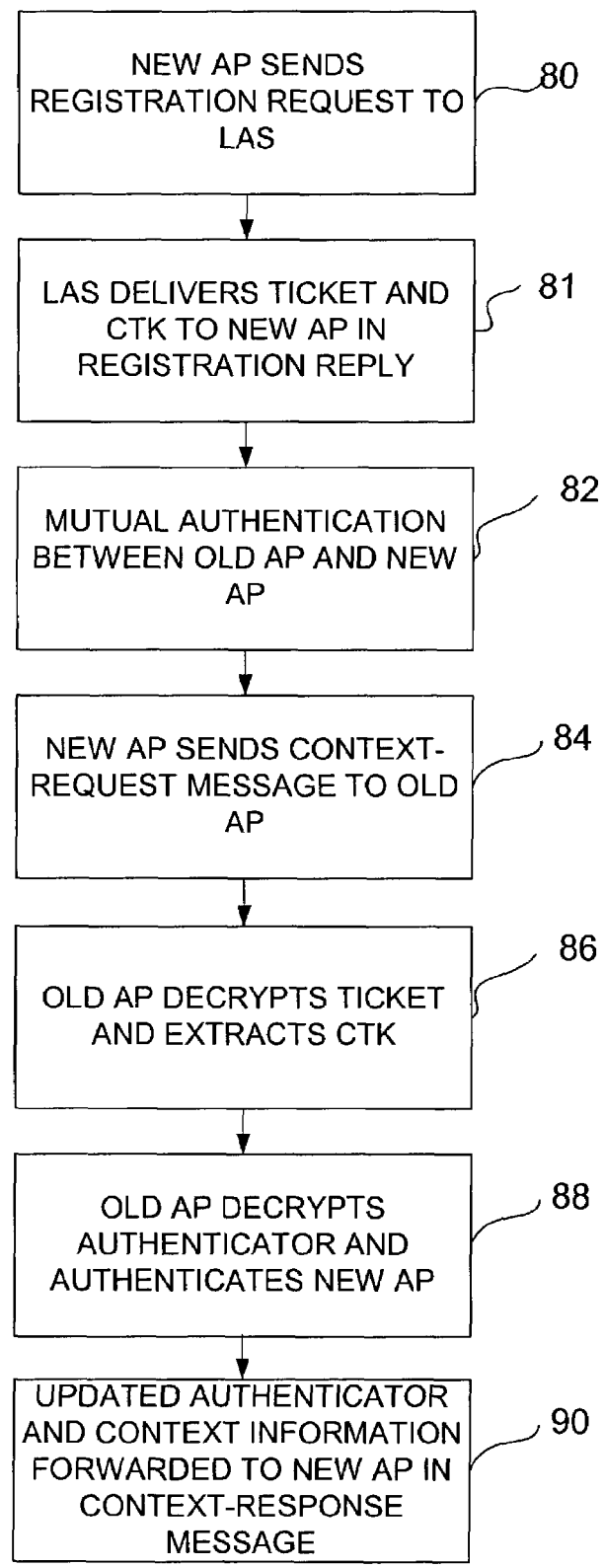
FIG. 8 is a flowchart illustrating a process for secure context transfer with the wireless security protocol.

When a client roams, the client's context has to be securely transferred from the old AP to the new AP. The LAS 28 controls a local context transfer domain and controls context transfer when a station roams between APs 24 in its domain. The CAS 26 controls context transfer when a station roams between LAS domains (FIG. 2). To facilitate mutual authentication and privacy for the context transfer, a LAS 28 (or CAS 26) functions as a KDC, the old AP 70 may function as a Kerberos-like application server, and the new AP 72 functions as a Kerberos-like client (FIG. 7). The LAS 28 (operating as a KDC) delivers a ticket to the new AP 72 that is encrypted with the session key shared between the LAS 28 and the old AP 70. The LAS 28 knows the old AP 70 for the client 30, because each client and its current parent AP are registered with the LAS, as previously described. The LAS 28 automatically generates a context transfer key (CTK) and a context transfer ticket. When a client roams, the new AP 72 sends a registration request message to the LAS 28 (step 80) (FIGS. 7 and 8). The LAS 28 delivers a Kerberos-like ticket for the old AP, and a CTK to the new AP 72 in a registration reply message (step 81). The ticket is encrypted with the session key of the old AP 70 and it also contains the CTK. Mutual authentication between the old AP 70 and the new AP 72 then proceeds as previously described (step 82). The new AP 72 sends a context-request message to the old AP 70 (step 84). The context-request message contains the ticket and a Kerberos-like authenticator (e.g., as defined in version 4 of Kerberos). The old AP 70 decrypts the ticket and extracts the CTK (step 86). The old AP 70 uses the CTK to decrypt the authenticator and authenticate the new AP 72 (step 88). The authenticator is updated (i.e., incremented) and re-encrypted with the CTK. The old AP 70 uses the CTK to authenticate and, optionally, encrypt the client's context information. A Message Integrity Check (MIC), generated with the CTK, may be used to authenticate the client's context information. The updated authenticator and context information are then forwarded to the new AP 72 in a context-response message (step 90). The new AP 72 uses the CTK to decrypt the authenticator and authenticate the old AP and to authenticate (and possibly decrypt) the client's context information.

Figure 9:
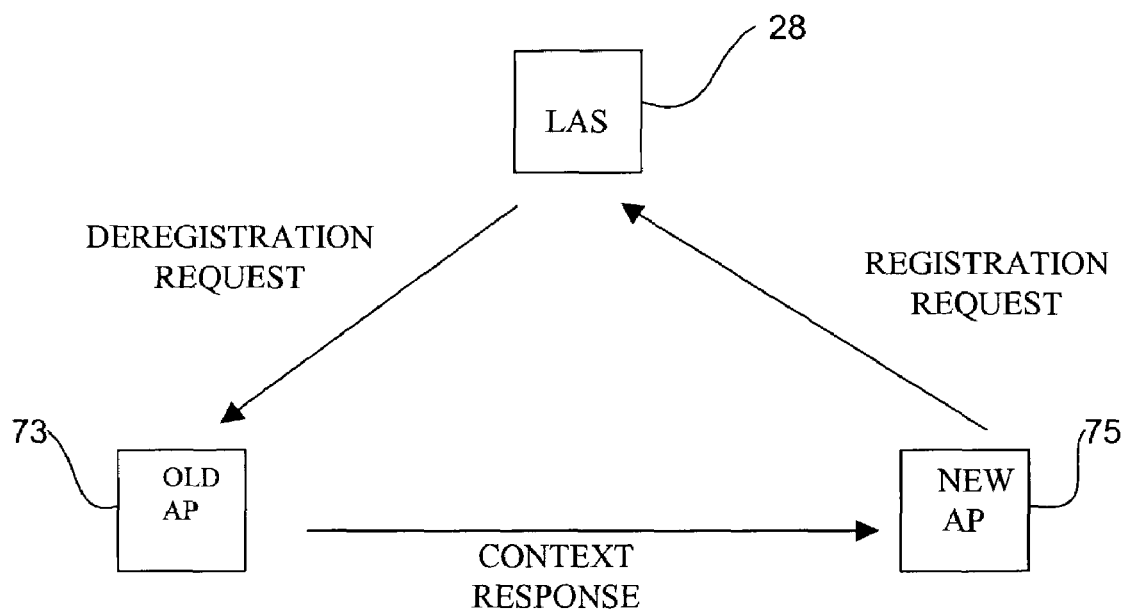
FIG. 9 is a diagram illustrating a second process for secure context transfer with the wireless security protocol.
Figure 10:
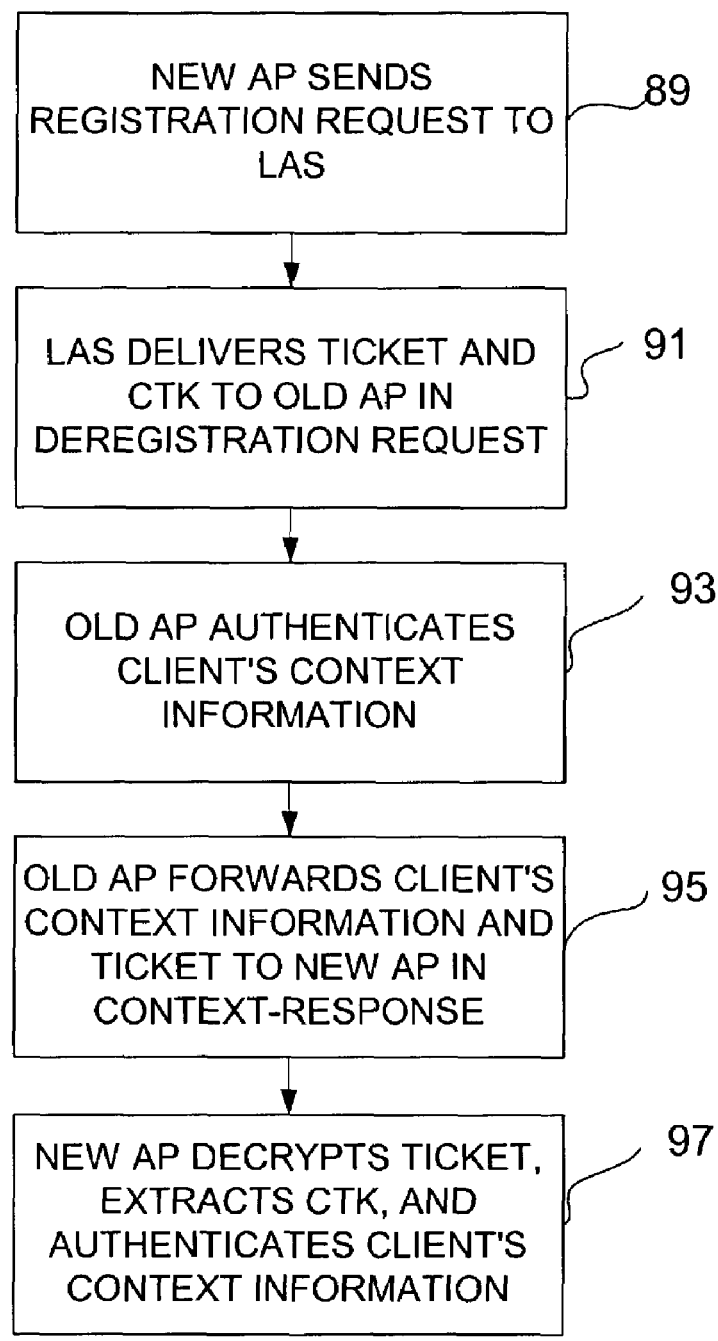
FIG. 10 is a flowchart illustrating the second process for secure context transfer with the wireless security protocol.

A second method for securely transferring context is illustrated in FIGS. 9 and 10. When a client roams, the new AP 72 sends a registration request message to the LAS 28 (step 89). The LAS 28 delivers a ticket for the new AP 72, and a CTK to the old AP 70, in a deregistration request message (step 91). The CTK is encrypted with the old AP's session key and the ticket (which also includes the CTK) is encrypted with the new AP's session key. The old AP 70 uses the CTK to authenticate and optionally encrypt the client's context information (step 93). The old AP 70 then forwards the client's context information and the ticket to the new AP 72 in an unsolicited context-response message (step 95). The new AP 72 decrypts the ticket with its session key, extracts the CTK, and uses it to authenticate the client's context information (step 97).

Faster reauthentication may be provided for roaming clients 30 by predictivley forwarding client session keys to select wireless security protocol nodes. For example, in FIG. 2, the session key for client 1 can be securely forwarded to AP2 or LAS2, if the client is expected to roam to AP2 or to the LAS2 domain.

Figure 11:
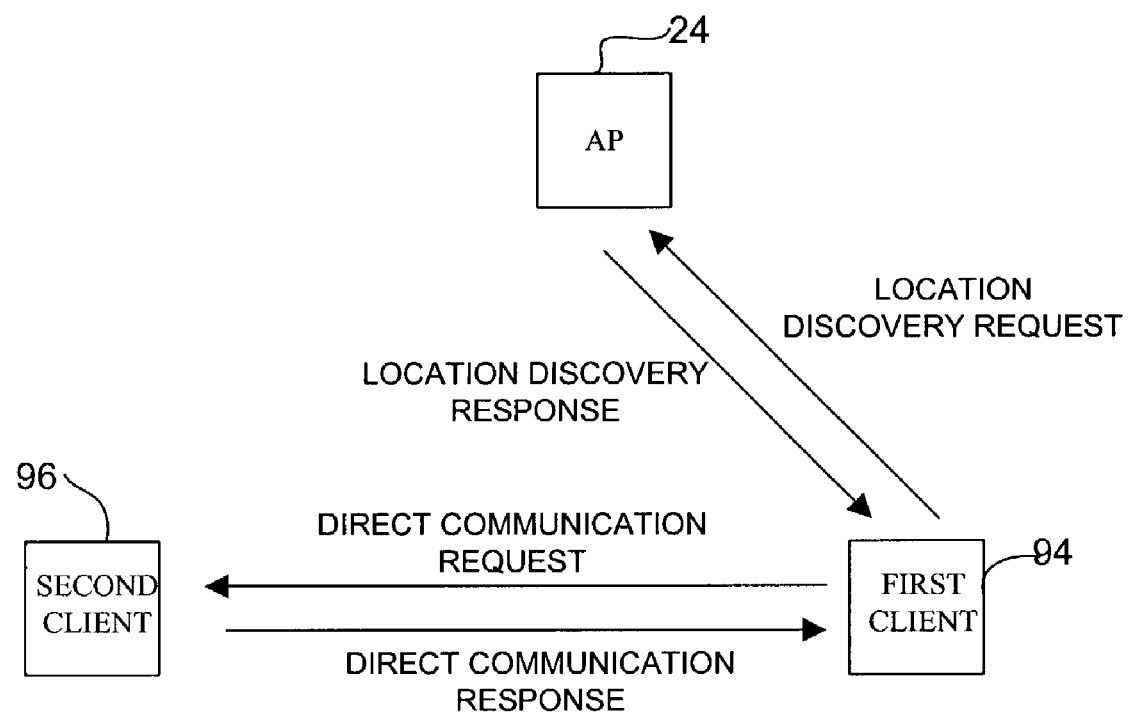
FIG. 11 is a diagram illustrating message exchange for secure sidestream transmissions with the wireless security protocol.
Figure 12:
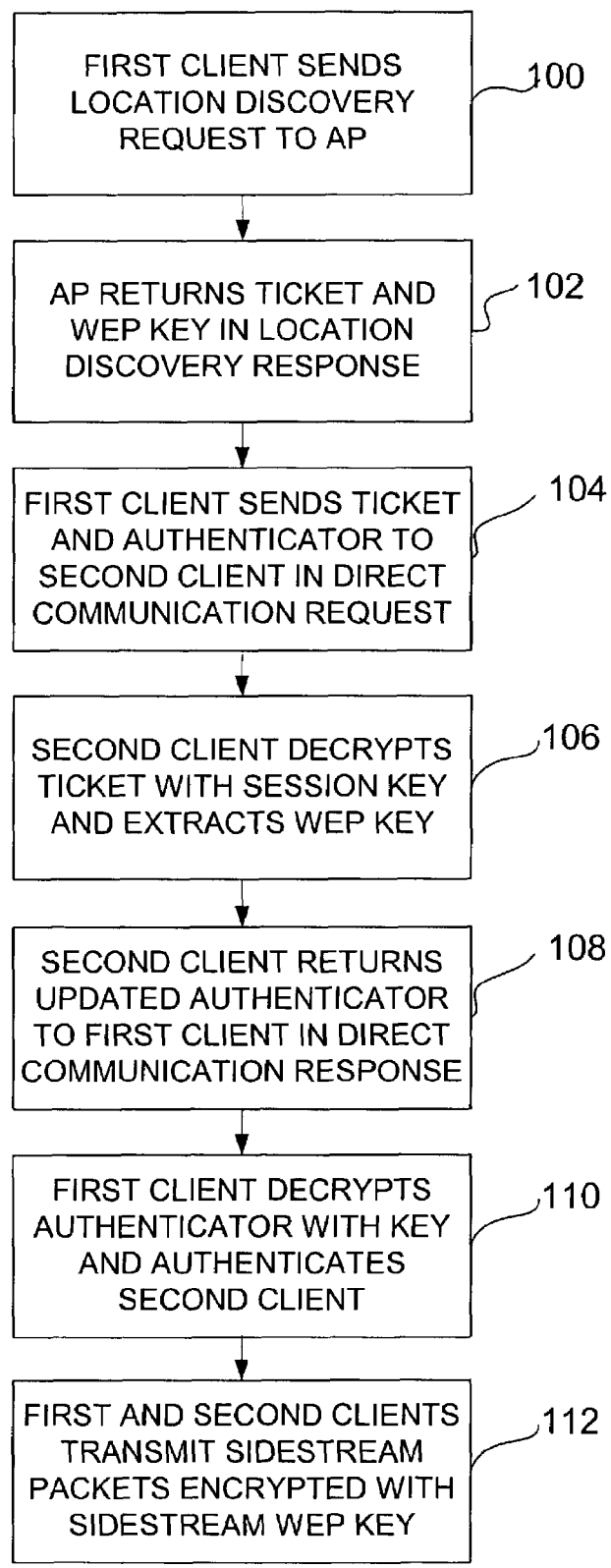
FIG. 12 is a flowchart illustrating a process for sidestream transmissions with the wireless security protocol.

The wireless security protocol also provides sidestream authentication and privacy as illustrated in FIGS. 11 and 12. The diagram of FIG. 11 shows sidestream transmissions between a first client 94 and a second client 96. The AP 24 functions as a KDC. A first client 94 sends a location discovery request to AP 24 (step 100). The AP 24 returns a ticket and a sidestream WEP key in a location discovery response (step 102). The WEP key is encrypted with the session key of the requesting first client 94. The ticket is encrypted with the session key of the second client 96 and also contains the sidestream WEP key. The first client 94 sends the ticket and a Kerberos authenticator (as defined in version 4 of Kerberos) to the second client 96 in a direct communication request (step 104). The authenticator is encrypted with the sidestream WEP key and the authenticator value is set to the TSF timer shared by the clients 94, 96, and the AP 24. The second client 96 decrypts the ticket with its session key and extracts the WEP key which is then used to decrypt and update the authenticator (step 106). The second client 96 then returns the updated authenticator to the first client 94 in a direct communication response (step 108). The first client 94 decrypts the authenticator with the sidestream WEP key and authenticates the second client 96 (step 110). The first and second clients 94, 96 can now transmit sidestream packets encrypted with the sidestream WEP key (step 112). The key may also be an AES (Advanced Encryption Standard) key, for example.

Figure 13:
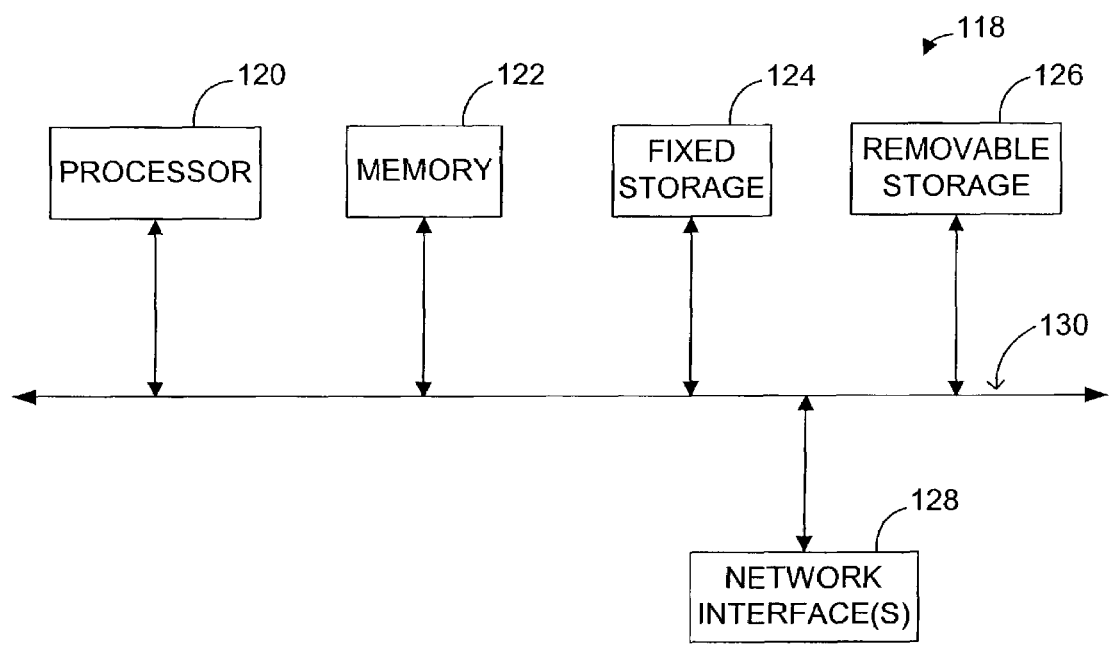
FIG. 13 is a system block diagram of a computer system that can be utilized to execute software of an embodiment of the present invention.

FIG. 13 shows a system block diagram of computer system 118 that may be used to execute software of an embodiment of the invention. The computer system 118 includes memory 122 which can be utilized to store and retrieve software programs incorporating computer code that implements aspects of the invention, data for use with the invention, and the like. Exemplary computer readable storage media, include CD-ROM, floppy disk, tape, flash memory, system memory, and hard drive. Computer system 118 further includes subsystems such as a central processor 120, fixed storage 124 (e.g., hard drive), removable storage 126 (e.g., CD-ROM drive), and one or more network interfaces 128. Other computer systems suitable for use with the invention may include additional or fewer subsystems. For example, computer system 118 may include more than one processor 120 (i.e., a multi-processor system) or a cache memory. The computer system 118 may also include a display, keyboard, and mouse (not shown) for use as a host.

The system bus architecture of computer system 118 is represented by arrows 130 in FIG. 13. However, these arrows are only illustrative of one possible interconnection scheme serving to link the subsystems. For example, a local bus may be utilized to connect the central processor 120 to the system memory 122. Computer system 118 shown in FIG. 13 is only one example of a computer system suitable for use with the invention. Other computer architectures having different configurations or subsystems may also be utilized. Communication between computers within the network is made possible with the use of communication protocols, which govern how computers exchange information over a network.

As can be observed from the foregoing, the present invention has numerous advantages. For example, the dynamic establishment of a KDC in an LAS removes the need to access a remote server each time a client roams. The wireless security protocol does not require all APs within the roaming domain of the client to share a master secret key. A client's session key is securely transferred to the new parent AP when the client roams, so that it is not necessary to generate a new key. The secure context transfer mechanism does not require any pre-existing security relationship (e.g., a shared secret key) between the old AP and the new AP. Furthermore, the new AP does not need to independently discover the address of the old AP. The wireless security protocol is completely transparent to higher-layer authentication logic and enables fast mutual authentication between a client and a new parent AP, without involving the services of an AAA server.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for reauthentication during client roaming in a wireless network system, the network having at least one access server operable to communicate with an a remote authentication server during an initial authentication of the client, and a plurality of access points, the access points being registered with the access server, the method comprising:

receiving a registration request at the access server from a new access point for a roaming client registered with the access server and previously in communication with an old access point, the request including a ticket or authenticator;

authenticating the registration request with an authentication extension generated with a secret session key shared by the new access point and the access server, wherein authenticating the registration request comprises comparing timer values from the client and the new access point; and sending a client's session key from the access server to the new access point in a registration reply upon authentication of the registration request at the access server;

wherein the client's session key is configured for use by the new access point to reauthenticate the client and establish encryption keys for the client without contacting the authentication server; and wherein said at least one access server comprises a central access server at a top level of a hierarchy, and a local access server at a second level of said hierarchy and registered with the central access server, the access points located at a third level of said hierarchy.

2. The method of claim 1 wherein comparing timer values comprises decrypting the client ticket with the client's session key.

3. The method of claim 1 wherein authenticating the registration request further comprises comparing a client TSF timer with an access point TSF timer to prevent replays of old registration messages.

4. The method of claim 1 wherein authenticating the registration request further comprises decrypting the client ticket with a secret key known only to the access server.

5. The method of claim 1 wherein sending the registration reply comprises sending access point bindings and context.

6. The method of claim 5 further comprising encrypting the client's session key and inserting into the reply.

7. The method of claim 1 further comprising inserting an authentication status in the registration reply.

8. The method of claim 1 further comprising sending a reassociation response from the access point to the client.

9. The method of claim 8 further comprising inserting an authentication status indicator into the reassociation response.

10. The method of claim 1 further comprising sending a success message from the access point to the client if the registration is successful.

11. The method of claim 1 further comprising initiating full higher-layer authentication at the client if authentication is not successful.

12. The method of claim 1 further comprising securely transferring context from an old access point to the new access point.

13. The method of claim 12 comprising sending an old access point ticket and encryption key from the access server to the new access point.

14. The method of claim 12 further comprising sending a binding-update message from the new access point to the old access point.

15. The method of claim 1 further comprising forwarding client session keys from the access server to a second access point if client is expected to roam to the second access point.

16. The method of claim 1 wherein each of the access points shares a secret session key with the access server.

17. The method of claim 1 wherein the access server is configured to operate as a key distribution center.

18. The method of claim 17 wherein each of the access points have a session key configured to access the key distribution center.

19. A wireless security protocol system for reauthentication during client roaming, comprising:

a central access server at a top level of a hierarchy of the protocol system; and a plurality of local access servers at a second level of said hierarchy and associated with the central access server, each local access server having at least one access point associated therewith, the access points at a third level of said hierarchy and each being registered with the associated-local-access servers and central access server;

wherein the local access server comprises a processor configured to mutually authenticate and establish a secret session key with the central access server and the access points through an a remote authentication server, and operate as a key distribution center for clients roaming between different access points so that no authentication is required between the client and the authentication server during roaming between an old access point and a new access point, the processor further configured to receive a registration request from the new access point for a roaming client, authenticate the registration request with an authentication extension generated with a secret session key shared by the new access point and the local access server, compare timer values from the client and the new access point during authentication, and send a client's session key to the new access point in a registration reply upon authentication of the registration request at the local access server.

20. The system of claim 19 wherein the local access server comprises a key distribution center.

21. A computer-readable storage medium comprising computer readable program codes for reauthentication during client roaming in a wireless network system, the wireless network system comprising at least one access server operable to communicate with an a remote authentication server during an initial authentication of the client, and a plurality of access points, the access points being registered with the access server, the program codes comprising:

code that receives a registration request at the access server from a new access point for a roaming client registered with the access server and previously in communication with an old access point, the request including a ticket;

code that authenticates the registration request with an authentication extension generated with a secret session key shared by the new access point and access server, wherein authenticating the registration request comprises comparing timer values from the client and the new access point; and code that sends a client's session key from the access server to the new access point in a registration reply upon authentication of the registration request at the access server, wherein the client's session key is configured for use by the new access point to reauthenticate the client and establish keys for the client without contacting the authentication server;

wherein said at least one access server comprises a central access server at a top level of a hierarchy, and a local access server at a second level of said hierarchy and registered with the central access server, the access points located at a third level of said hierarchy.

22. The system of claim 19 wherein each of the access points shares a secret session key with the local access server.

23. The system of claim 20 wherein each of the access points has a session key configured to access the key distribution center.

24. The system of claim 19 wherein the processor is configured to transmit a reassociation response to said roaming clients, said reassociation response comprising an authentication status indicator.

25. The computer readable storage medium of claim 21 wherein code that sends the registration reply comprises code that sends access point bindings and context.

26. The computer readable storage medium of claim 21 wherein each of the access points shares a secret session key with the access server.

27. The computer readable storage medium of claim 21 wherein the access server is configured to operate as a key distribution center.

\* \* \* \* \*